United States Patent
Bae (10) Patent No.: US 8,661,526 B2
(45) Date of Patent: Feb. 25, 2014

(54) METHOD AND APPARATUS FOR PERFORMING LOGIN BY MOBILE STATION IN WIRELESS COMMUNICATION SYSTEM

(75) Inventor: Su-Jin Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 12/927,465

(22) Filed: Nov. 16, 2010

(65) Prior Publication Data

US 2011/0119757 A1 May 19, 2011

(30) Foreign Application Priority Data

Nov. 16, 2009 (KR) .................. 10-2009-0110410

(51) Int. Cl.
*G06F 7/04* (2006.01)
(52) U.S. Cl.
USPC .......................................................... 726/17
(58) Field of Classification Search
USPC .................. 726/4, 17, 6, 7; 713/168, 182
See application file for complete search history.

(56) References Cited

U.S. PATENT DOCUMENTS

| 7,437,457 | B1 * | 10/2008 | Eisendrath et al. | 709/225 |
| 7,509,266 | B2 * | 3/2009 | Rogers et al. | 705/7.32 |
| 2010/0177671 | A1 * | 7/2010 | Qiu et al. | 370/310 |

* cited by examiner

*Primary Examiner* — Beemnet Dada (57) ABSTRACT

There are provided a method and apparatus for performing a login by a Mobile Station (MS) in a wireless communication system. In an Internet Protocol Multimedia Subsystem (IMS) network in a wireless communication system, an MS transmits a temporary login request to an IMS server by using a subscriber identity (ID) as a virtual Private Identity (PRID) and receives information about registered PRIDs that are associated with the subscriber ID. The MS determines whether at least one of PRIDs managed by the MS is unregistered in the IMS server. If at least one of the managed PRIDs is unregistered in the IMS server, the MS performs login to the IMS server using one of the managed PRIDs that is unregistered in the IMS server. If none of the managed PRIDs are unregistered in the IMS server, the MS performs login to the IMS server using one of the managed PRIDs that is registered.

10 Claims, 7 Drawing Sheets

METHOD AND APPARATUS FOR PERFORMING LOGIN BY MOBILE STATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Nov. 16, 2009 and assigned Serial No. 10-2009-0110410, the entire disclosure of which is hereby incorporated by reference.

TECHNICAL FIELD OF THE INVENTION

The present invention relates to a method and apparatus for performing login (or logon) by a Mobile Station (MS) in a wireless communication system.

BACKGROUND OF THE INVENTION

In an IP Multimedia Subsystem (IMS) network, two types of Identities (IDs) are provided to subscribers.

One of the two different types of IDs is a Private Identity (PRID) used for subscriber authentication, and the other is a Public Identity (PUID), which is a phone number used for actual communication.

In the IMS network, an association relationship of n:m may be established between PRIDs and PUIDs. That is, a plurality of PRIDs may be mapped to one PRID, and a plurality of PRIDs may be mapped to one PUID.

A subscriber may have a plurality of PRIDs, which means that one subscriber may own a plurality of MSs. The plurality of PRIDs are assigned to one PUID, allowing the subscriber to simultaneously use the plurality of MSs with one phone number.

Meanwhile, if there are three MSs using the same PUID, three PRIDs are registered in the IMS network and undergo authentication. The PRIDs are uniquely assigned to the MSs in a fixed manner, and it is impossible that one PRID is dynamically assigned to a plurality of MSs.

In the IMS network, PRIDs are provided by an IMS Subscriber Identity Module (ISIM). Because MSs undergo authentication in the IMS network using authentication keys stored in the ISIM, authentication keys for authentication are uniquely assigned to the MSs in a fixed manner, making it impossible to change the assignment of authentication keys. In addition, authentication key information may not be shared between MSs with no ISIM, and it may not be shared even between different MSs owned by the same subscriber and that use the same phone number.

Meanwhile, in the conventional IMS network, it is not possible for the service provider to limit the number of MSs owned by each subscriber, and even the IMS network has no way to limit the number of authentication keys, i.e., the number of MSs capable of making authentication request with the same phone number. For example, even though a subscriber has registered eight MSs, he or she mainly uses only three MSs for actual communication. Consequently, the IMS network may unnecessarily waste resources and database space in storing and managing information about the other five MSs.

SUMMARY OF THE INVENTION

To address the above-discussed deficiencies of the prior art, it is a primary object to provide at least the advantages described below. Accordingly, an aspect of the present invention is to provide a method and apparatus for performing login by an MS in a wireless communication system.

Another aspect of the present invention is to provide a method and apparatus for allowing an MS to dynamically log in to an IMS network without using a separate ISIM-based authentication key in a wireless communication system.

Another aspect of the present invention is to provide a method and apparatus for logging off a specific MS(s) to limit the number of MSs which are logged in with one phone number in a wireless communication system.

Yet another aspect of the present invention is to provide a method and apparatus for allowing an IMS operator to provide various services by limiting the number of logged-in MSs in a wireless communication system.

In accordance with one aspect of the present invention, there is provided a method for performing login by a Mobile Station (MS) within an Internet Protocol Multimedia Subsystem (IMS) network in a wireless communication system. The MS transmits a temporary login request to an IMS server by using a subscriber identity (ID) as a Private Identity (PRID) and receives from the IMS server information about registered PRIDs that are associated with the subscriber ID. The MS then determines whether at least one of PRIDs managed by the MS is unregistered in the IMS server. If at least one of the managed PRIDs is unregistered in the IMS server, the MS performs login to the IMS server using one of the managed PRIDs that is unregistered in the IMS server. If none of the managed PRIDs are unregistered in the IMS server, the MS performs login to the IMS server using one of the managed PRIDs that is registered in the IMS server.

In accordance with another aspect of the present invention, there is provided a Mobile Station (MS) for performing login within an Internet Protocol Multimedia Subsystem (IMS) network in a wireless communication system. The MS includes a transceiver for communicating with an IMS server. A memory stores a subscriber identity (ID) and Private Identities (PRIDs) being managed by the MS. And a controller transmits a temporary request to the IMS server by using the subscriber ID as a virtual PRID, determines whether at least one of the PRIDs managed by the MS are unregistered in the IMS server, performs login to the IMS server using one of the managed PRIDs that is unregistered in the IMS server, if at least one of the managed PRIDs is unregistered in the IMS server, and performs login to the IMS server using one of the managed PRIDs that is registered in the IMS server, if none of the managed PRIDs are unregistered in the IMS server.

In accordance with yet another aspect of the present invention, there is provided a method in an Internet Protocol Multimedia Subsystem (IMS) server for supporting login by a requesting Mobile Station (MS). The method includes receiving a login request from the requesting MS, the login request comprising a requested Private Identity (PRID). The IMS server determines whether the login request is a temporary login request. If the login request is not a temporary login request, the IMS server determines whether the requested PRID is currently in use by another MS. If the requested PRID is currently in use by another MS, the IMS server logs off the other MS that is currently using the requested PRID and logs on the requesting MS using the requested PRID.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device.

An embodiment of the present invention provides a method and apparatus for performing login by an MS in a wireless communication system. To be specific, in this specification, a description will be made of a method and apparatus for performing login by an MS in an IP Multimedia Subsystem (IMS) network. The IMS network may include, for example, Mobile Worldwide Interoperability for Microwave Access (WiMAX), Wideband Code Division Multiple Access (WCDMA), High Speed Downlink Packet Access (HSDPA), Code Division Multiple Access (CDMA), and Evolution-Data Optimized (EvDO).

An embodiment of the present invention provides a method for limiting the maximum number of MSs capable of undergoing authentication and login, not using ISIM-based authentication keys fixedly assigned to individual MSs, but using an authentication key pool accessible by any MS.

Now, a wireless communication system according to an embodiment of the present invention will be described with reference to FIG. 1.

Figure 1:
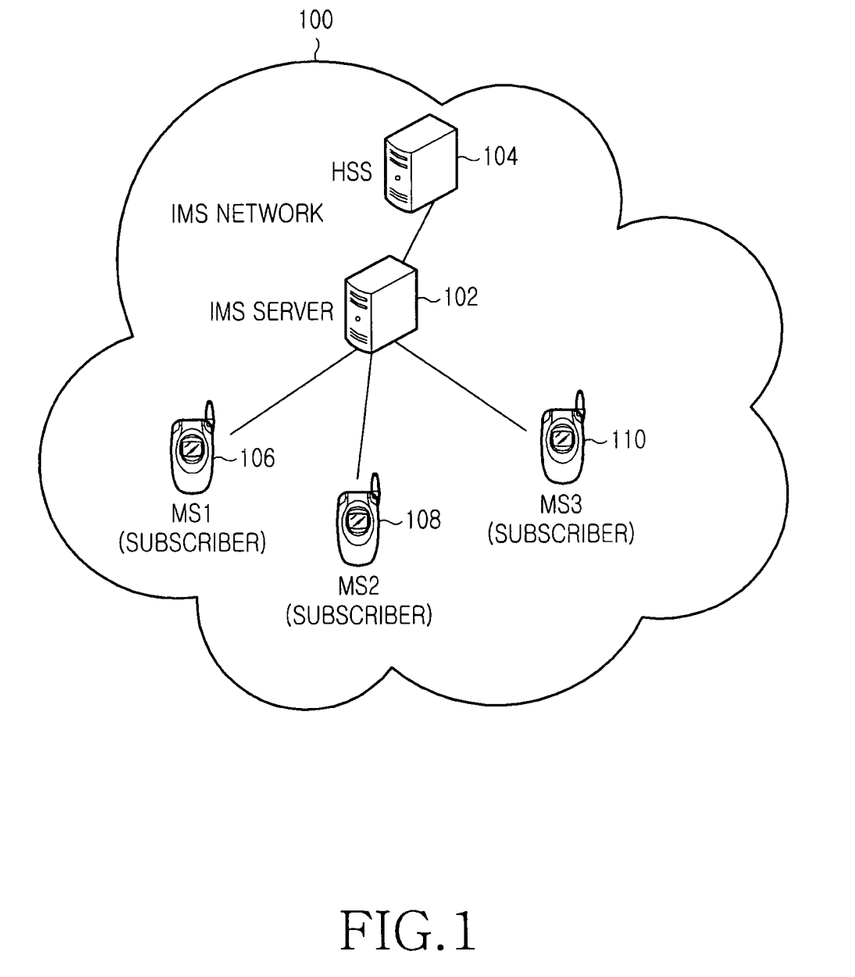
FIG. 1 illustrates a diagram of a wireless communication system according to an embodiment of the present invention.

FIG. 1 illustrates a wireless communication system according to an embodiment of the present invention.

Referring to FIG. 1, the wireless communication system includes an IMS network 100. The IMS network 100 includes an IMS server 102, a Home Subscriber Server (HSS) 104, and first to third MSs 106~110.

The IMS server 102 performs authentication and login processing on the first to third MSs 106~110 and manages sessions for the logged-in MSs. The IMS server 102 receives profiles of the first to third MSs 106~110 from the HSS 104, and performs call and service processing on each of the first to third MSs 106~110.

The HSS 104 stores and manages profiles of the first to third MSs 106~110, which are subscribers of the IMS network 100. The HSS 104 stores an address of an application server that provides services to each of the first to third MSs 106~110 and informs the IMS server 102 of the stored address of the application server. The HSS 104 stores Public Identity (PUID) information, Private Identity (PRID) information generated using a subscriber ID of an individual subscriber, and mapping information between the PUID and the PRID.

Among the first to third MSs 106~110, the first MS 106 is assigned a subscriber ID for subscriber identification from the IMS server 102 during its IMS service subscription. In addition, the first MS 106 is assigned a PUID for communication in the IMS network 100 from the IMS server 102. The PUID may be, for example, a phone number.

During IMS service subscription, a subscriber may register a plurality of MSs, including the first MS 106. If the subscriber additionally registers the second and third MSs 108 and 110, PRIDs of the first to third MSs 106~110 are mapped to the assigned PUID. Accordingly, the first to third MSs 106~110 may perform communication using the same phone number, and may receive IP-based additional services after logging in to the IMS network 100 using their own PRIDs.

Now, a relationship among a subscriber ID of an individual subscriber, a PUID and a PRID will be described in detail with reference to FIG. 2.

Figure 2:
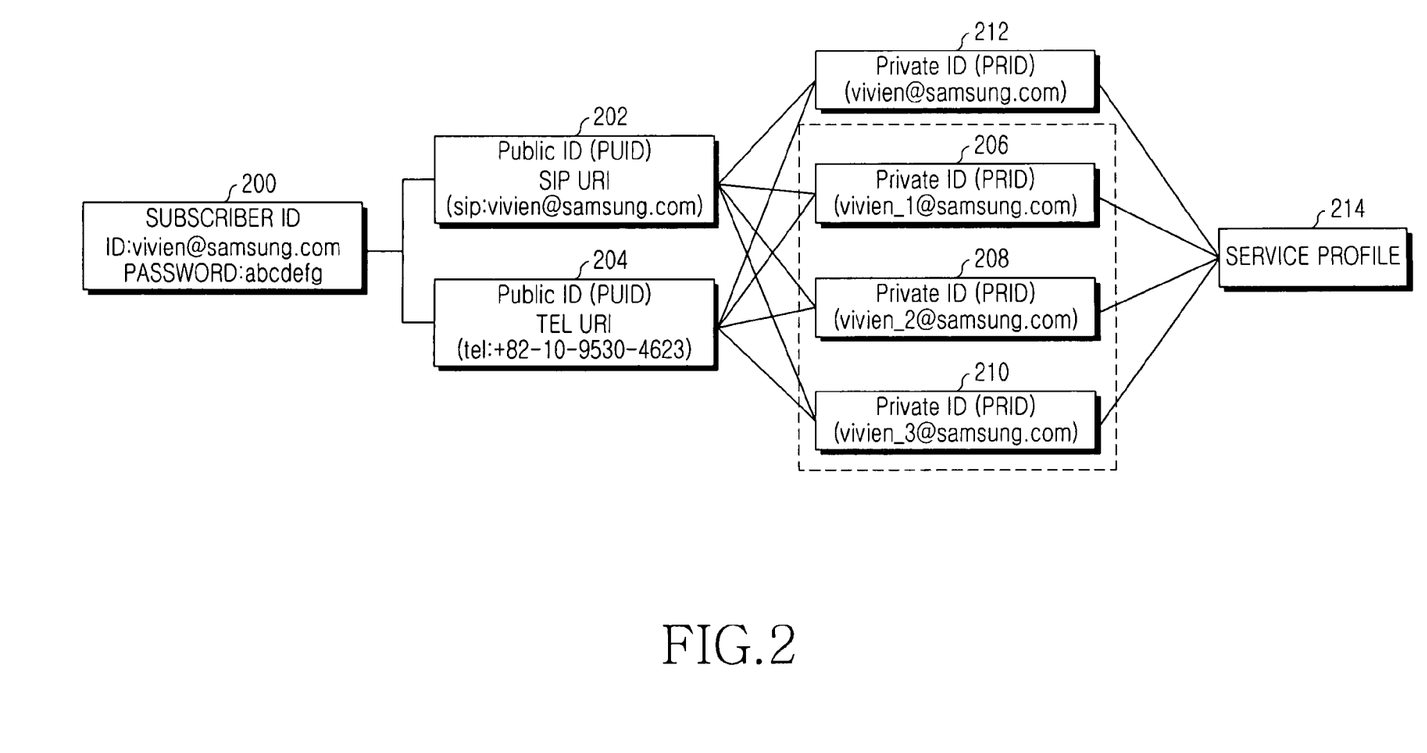
FIG. 2 illustrates a diagram of a relationship among a subscriber ID of an individual subscriber, a PUID, and a PRID according to an embodiment of the present invention.

FIG. 2 illustrates a relationship among a subscriber ID of an individual subscriber, a PUID, and a PRID according to an embodiment of the present invention.

Referring to FIG. 2, when a subscriber subscribes to an IMS service, a set 200 of a subscriber ID and a password for subscriber authentication is determined. The subscriber ID and the password may be determined in various ways, such as being decided by the subscriber, or being assigned by the IMS server 102.

Once the subscriber ID and the password are determined, a PUID for communication in the IMS network 100 is assigned to the subscriber. The number of assignable PUIDs depends on the protocol type. In the example of FIG. 2, a Session Initiation Protocol (SIP)-based SIP URI 202 and a phone number-based TEL URI 204 are assigned as PUIDs.

When subscribing to the IMS service, the subscriber may register a plurality of MSs. If the number of registered MSs is 3, three PRIDs 206~210 are assigned. The PRIDs 206~210 may be generated using the subscriber ID 200 or the like. In the example of FIG. 2, the PRIDs 206~210 are generated by adding serial numbers 1, 2, and 3 to ID vivien@samsung.com. The PRIDs 206~210 are managed after being mapped to each of the PUIDs 202 and 204.

Meanwhile, in addition to the PRIDs 206 and 210, a PRID 212 being identical to the subscriber ID 200 may be used additionally.

That is, if the subscriber uses three MSs in the IMS network 100, the PRID 212, or a subscriber ID, is used as another PRID, in addition to the three PRIDs 206~210 for authentication of the three MSs.

The three PRIDs 206~210 refer to actual PRIDs to be actually used for authentication of the three MSs in the IMS network 100, and the PRID 212 made from the subscriber ID 200 refers to a virtual PRID to be temporarily used to acquire the actual PRID information.

If the subscriber ID 200, the PUIDs 202 and 204, and the PRIDs 206~212 are all determined, the determined subscriber ID 200, PUIDs 202 and 204, and PRIDs 206~212 are registered in the HSS 104, and a service profile 214 for the subscriber is determined. The subscriber may know only his or her own PUIDs 202 and 204 for communication, and may not be aware of the subscriber ID 200 and the PRIDs 206~212. The subscriber ID 200 and the PRIDs 206~212 may be used only for operations by the operator.

Next, a structure of an MS according to an embodiment of the present invention will be described with reference to FIG. 3.

Figure 3:
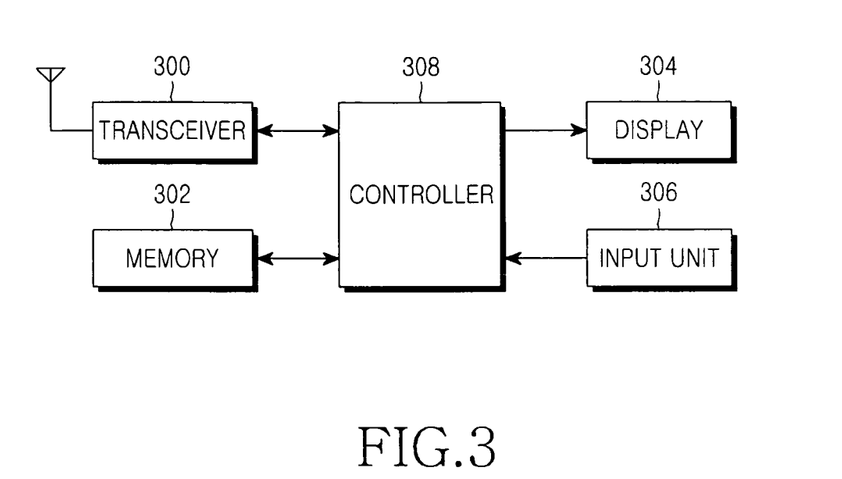
FIG. 3 illustrates a block diagram of an MS according to an embodiment of the present invention.

FIG. 3 illustrates a structure of an MS according to an embodiment of the present invention.

Referring to FIG. 3, the MS includes a transceiver 300, a memory 302, a display 304, an input unit 306, and a controller 308.

The transceiver 300 performs radio communication of the MS. The transceiver 300 also performs communication with the IMS server 102 or application servers in the IMS network 100. For example, the transceiver 300 may receive messages or packet signals transmitted from the IMS server 102 or the application servers in the IMS network 100.

The memory 302 stores a variety of information used to control an operation of the MS, and information about a subscriber ID corresponding to the MS, one or more PUIDs, and PRIDs corresponding to the PUID. The memory 302 stores the PRIDs after classifying them into actual PRIDs and a virtual PRID.

The display 304, under the control of the controller 308, displays PRID information available during login, and PRID information used during login.

The input unit 306 includes various keys for receiving numeric and character information from the user. The input unit 306 receives inputs from the user, and outputs the input information to the controller 308. The input unit 306 is optional, if the display 304 is a touch screen-type display.

The controller 308 controls the transceiver 300, the memory 302, the display 304, and the input unit 306, and manages the overall operation of the MS. In an embodiment, the controller 308 generates actual PRIDs to be used during login, using the subscriber ID. A method in which the controller 308 generates the actual PRIDs is the same as the method of generating PRIDs stored in the HSS 104 in the IMS network 100. That is, the controller 308 transmits a login request to the IMS server 102 through the transceiver 300 using a PRID, and then receives a login confirm message including registered PRIDs from the IMS server 102.

For example, if the MS is one of three MSs owned by the same subscriber, three different PRIDs generated by adding serial numbers to the subscriber ID, for example, vivien_1@samsung.com, vivien_2@samsung.com, and vivien_3@samsung.com, may be stored in the HSS 104. Similar to the HSS 104, the controller 308 may generate three different PRIDs by adding serial numbers to the subscriber ID stored in the memory 302. The controller 308 stores and manages the generated three PRIDs in the memory 302. In other words, the controller 308 manages the information indicating whether or not each PRID is available for login.

Meanwhile, the controller 308 may receive, from the IMS server 102, information indicating that the subscriber uses three MSs, i.e., information indicating the number of PRIDs to be generated. As another example, the information indicating the number of PRIDs to be generated may be determined in various different ways, such as being decided in advance.

The controller 308 performs a login process to the IMS network 100 using the actual PRIDs and virtual PRID stored in the memory 302. The details thereof will be described below with reference to FIG. 4.

Figure 4:
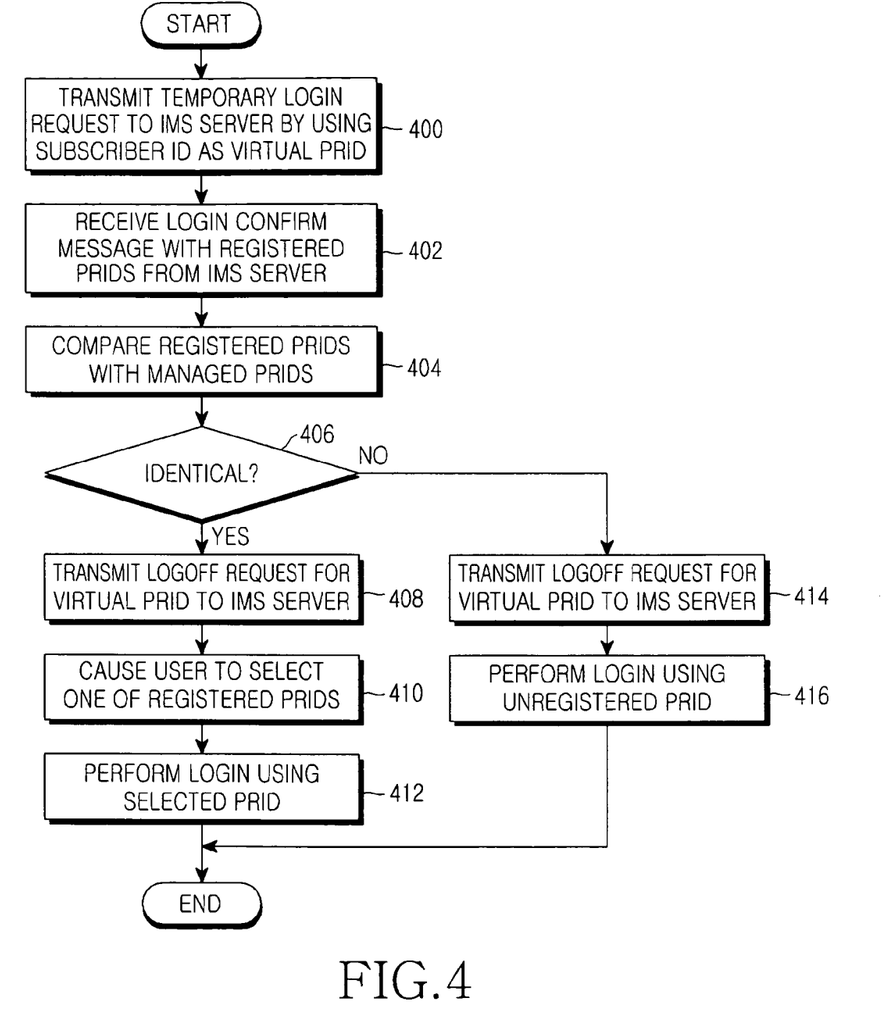
FIG. 4 illustrates a process for performing login by an MS according to an embodiment of the present invention.

FIG. 4 illustrates a process for performing login by an MS according to an embodiment of the present invention.

Referring to FIG. 4, in block 400, the controller 308 transmits a temporary login request to the IMS server 102 by using a subscriber ID as a virtual PRID. In block 402, the controller 308 receives a login confirm message including registered PRIDs from the IMS server 102. The registered PRIDs may refer to PRIDs that were registered in the IMS network 100 during login of the same subscriber with the subscriber ID.

In block 404, the controller 308 compares registered PRIDs included in the login confirm message with PRIDs stored and managed in the memory 302.

If all the managed PRIDs in the MS have already been registered in block 406, the controller 308 transmits a logoff (or logout) request for the virtual PRID to the IMS server 102 in block 408, determining that the managed PRIDs are all available.

And, the controller 308 has the user select one of the registered PRIDs in block 410. This is to allow the controller 308 to perform login using one of the previously registered PRIDs due to the absence of PRIDs available for login. Therefore, another MS, which has been logged in using the PRID selected by the user, is forced to log off by the IMS network 100.

In block 410, the controller 308 displays information about the registered PRIDs on the display 304, letting the user select at least one of them. For example, the controller 308 may display on the display 304 a phrase 'Select MS to be Logged Off' along with information (e.g., MS1, MS2, MS3) about MSs corresponding to the registered PRIDs to be selected by the user. The controller 308 may control the display 304 to display type information and capability information of MSs that were logged in using the PRIDs, along with the information about the registered PRIDs.

In block 412, the controller 308 performs login to the IMS server 102 using the selected PRID in block 412. At this point, another MS, which has been logged in using the selected PRID, is logged off.

Alternatively, if at least one managed PRID is not registered, the controller 308 transmits a logoff request for the virtual PRID to the IMS server 102 in block 414. Thereafter, in block 416, the controller 308 performs login using the unregistered PRID.

The above login process in an MS may be divided into the following three sub-processes, which include a first login process ('No' in block 406) by an MS in the absence of PRIDs registered in the IMS network 100, a second login process ('No' in block 406) by an MS in the presence of additional available PRIDs despite the presence of the PRIDs registered in the IMS network 100, and a third login process ('Yes' in block 406) by an MS in the absence of available PRIDs due to the registration of all PRIDs in the IMS network 100. The three processes will be described below in detail.

First, the first login process by an MS according to an embodiment of the present invention will be described with reference to FIG. 5.

Figure 5:
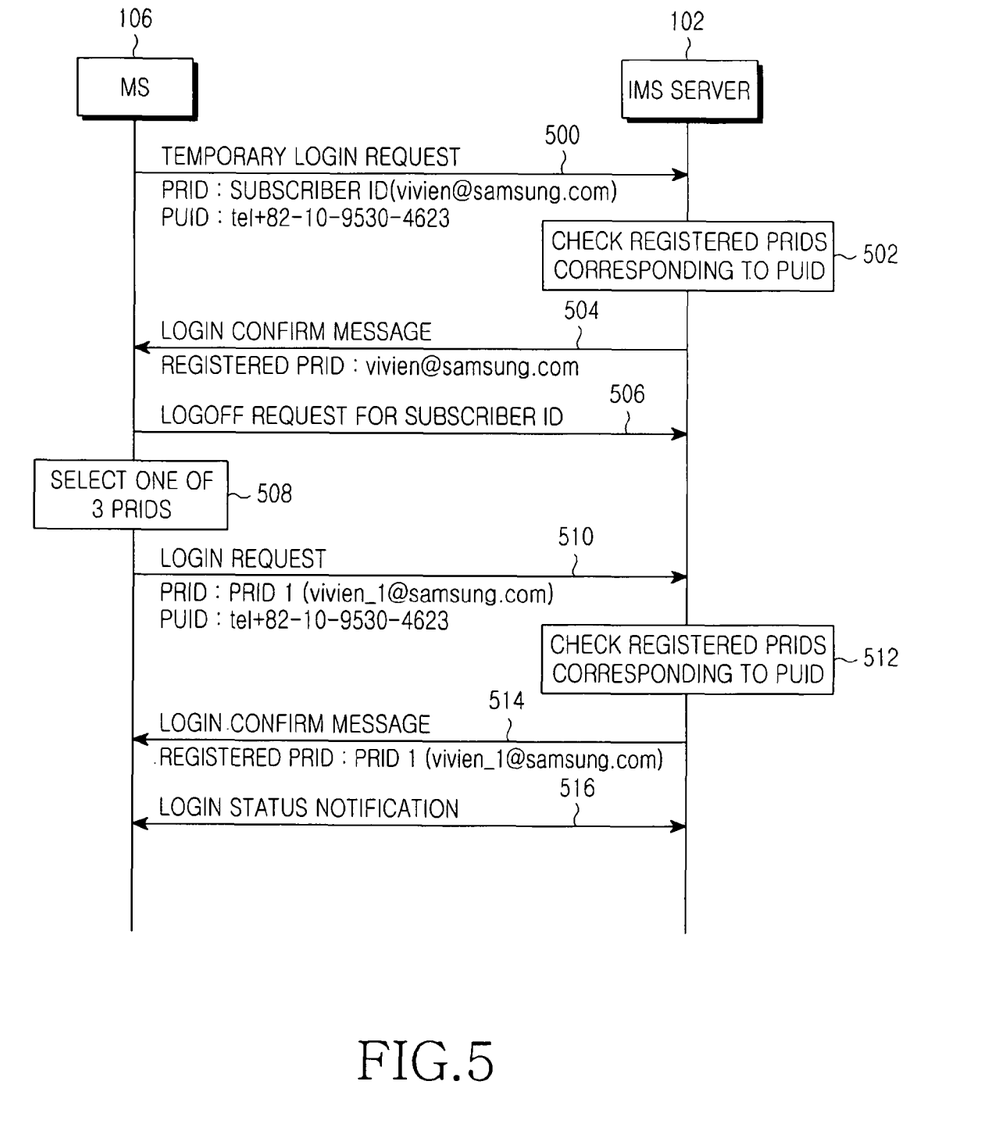
FIG. 5 illustrates a signal flow diagram of a first login process by an MS according to an embodiment of the present invention.

FIG. 5 illustrates a signal flow diagram of a first login process by an MS according to an embodiment of the present invention.

In the process of FIG. 5, a subscriber performs login to the IMS network for the first time when the subscriber uses three MSs in the IMS network, i.e., three PRIDs correspond to one PUID.

Because the subscriber performs login to the IMS network for the first time, there is no MS in the IMS network that have been logged in using the three PRIDs.

Referring to FIG. 5, the MS 106 manages a subscriber ID, one or more PUIDs, and available PRIDs, and also manages information indicating whether or not each PRID is available for login. Information about the subscriber ID, PUID and available PRIDs, which are managed by the MS, is shown in Table 1 below by way of example.

TABLE 1

<MS>
Subscriber ID: vivien@samsung.com
PUID : tel:+82-10-9530-4623
PRID List
   PRID 1 : vivien_1@samsung.com → Available (can be used for login)
   PRID 2 : vivien_2@samsung.com → Available (can be used for login)
   PRID 3 : vivien_3@samsung.com → Available (can be used for login)

While managing three PRIDs available for login to the IMS network in this way, in order to determine an actual PRID to be used for authentication during login to the IMS network, the MS 106 transmits a temporary login request 500 to the IMS server 102 by using the subscriber ID as a virtual PRID.

For example, if a subscriber ID included in an IMS registration request message is a virtual PRID, it may be treated as a temporary login request. The temporary login request 500 may be defined in an Extensible Markup Language (XML) form in a Session Initiation Protocol (SIP) message according to Table 2 below, by way of example.

TABLE 2

REGISTER sip:samsung.com SIP/2.0
   Contact: sip:vivien@172.16.15.24:14999;audio;video="FALSE";
   PRID="vivien@samsung.com"
   Authorization: Digest username="vivien@samsung.com"
   P-Preferred-Identity: sip:vivien@samsung.com As shown in Table 2, a subscriber ID is used as a virtual PRID during temporary login request.

After performing authentication on the subscriber using the subscriber ID, if it is determined that the subscriber is an authenticated subscriber, the IMS server 102 checks registered PRIDs corresponding to the subscriber's PUID, i.e., PRIDs which have been previously used during login, in block 502. The IMS server 102 may perform the above PRID check process by receiving PRID and PUID information corresponding to the subscriber ID from the HSS 104.

In response, the IMS server 102 transmits a login confirm message 504 including the authentication results and the registered PRIDs to the MS 106. The PRID information used during authentication request and the registered PRID information may be included in the login confirm message 504 if the authentication for the MS 106 was successful. The login confirm message 504 means, for example, an IMS registration confirm message.

In FIG. 5, the registered PRIDs are not present because of the absence of previously used PRIDs. Therefore, only the PRID information used during authentication request, i.e., vivien@samsung.com, is transmitted to the MS 106 along with the login confirm message 504. Then, the MS 106 may recognize that all of the three PRIDs managed by it are available.

The MS 106 subsequently transmits to the IMS server 102 a logoff request 506 for the subscriber ID that it used as a virtual PRID for temporary login. The logoff request 506 means, for example, an IMS de-registration request message. In block 508, the MS 106 selects one of the three PRIDs to use as an actual PRID. In FIG. 5, a PRID 1 is selected, by way of example.

The MS 106 then transmits a login request 510 to the IMS server 102 using the selected PRID 1. Upon receiving the login request 510, the IMS server 102 performs authentication on the subscriber using the selected PRID 1. If it is determined that the subscriber is an authenticated subscriber, the IMS server 102 checks the registered PRIDs corresponding to the subscriber's PUID in block 512.

The IMS server 102 then transmits to the MS 106 a login confirm message 514 including the authentication results and the registered PRIDs. Because the PRID 1 is used for login, information about the PRID 1 is transmitted to the MS 106.

As it is confirmed by the IMS server 102 that the PRID 1 has been authenticated, the MS 106 is authenticated by the IMS server 102 and finally registered in the IMS network. Accordingly, the IMS server 102 transmits or broadcasts a login status notification message 516 notifying other MSs that the PRID 1 is in use. As a result, other MSs may recognize that the PRID 1 is unavailable during login because it is registered.

The MS 106 updates a PRID list as shown in Table 3 below to notify that among the three PRIDs being managed by it, a PRID 2 and a PRID 3 except for the PRID 1 may be used as actual PRIDs for login.

TABLE 3

PRID List
   PRID 1 : vivien_1@samsung.com → Not Available (cannot be used for login)
   PRID 2 : vivien_2@samsung.com → Available (can be used for login)
   PRID 3 : vivien_3@samsung.com → Available (can be used for login)

Next, the second login process by an MS according to an embodiment of the present invention will be described with reference to FIG. 6.

Figure 6:
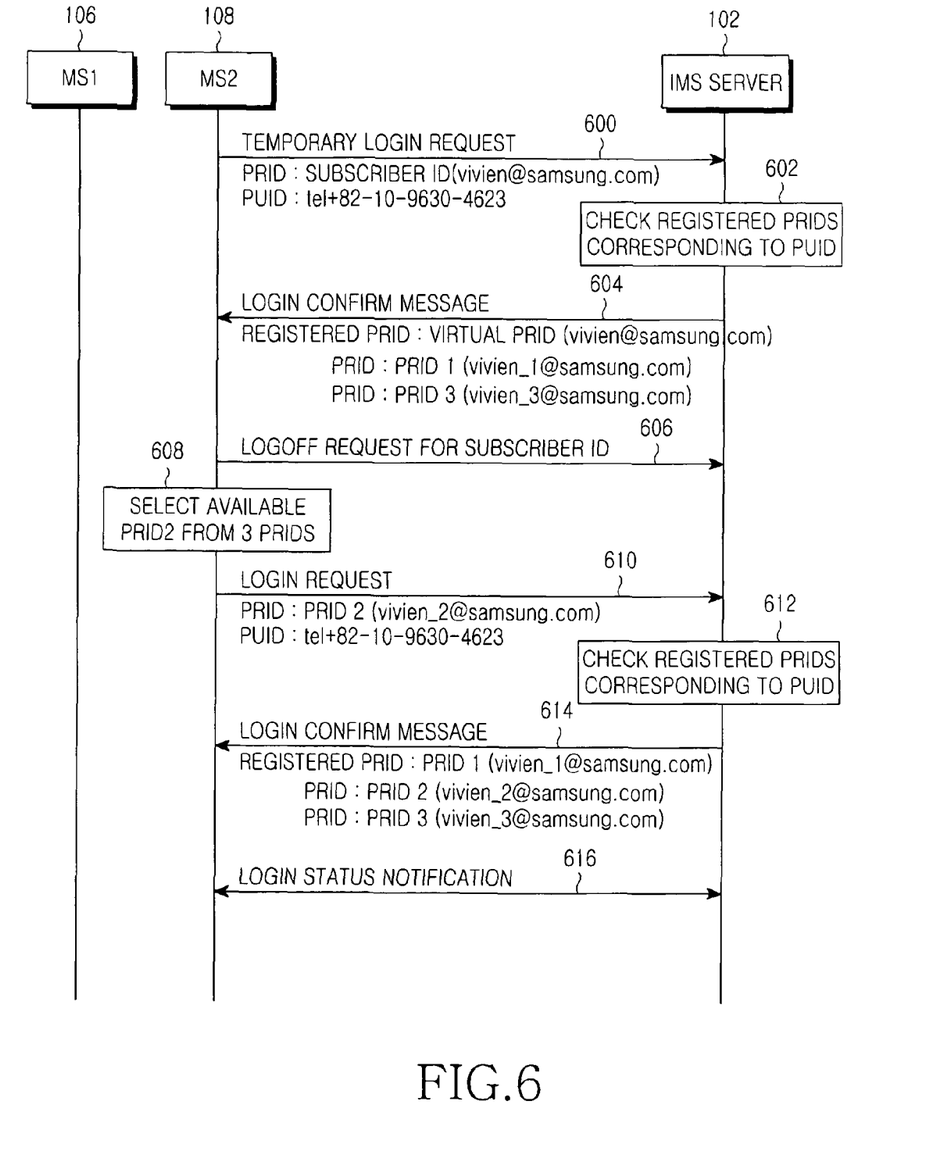
FIG. 6 illustrates a signal flow diagram of a second login process by an MS according to an embodiment of the present invention.

FIG. 6 illustrates a signal flow diagram of a second login process by an MS according to an embodiment of the present invention.

Referring to FIG. 6, the first and second MSs 106 and 108 represent MSs used or owned by the same subscriber, and they both generate and manage the same PRIDs. While managing three PRIDs for login to the IMS network, in order to determine an actual PRID to be used for authentication during login to the IMS network, the second MS 108 transmits a temporary login request 600 to the IMS server 102 by using a subscriber ID as a virtual PRID. The temporary login request 600 may be defined in an XML form in an SIP message as shown in Table 2 described above.

After performing authentication on the subscriber using the subscriber ID included in the temporary login request 600, if it is determined that the subscriber is an authenticated subscriber, the IMS server 102 checks the registered PRIDs corresponding to the subscriber's PUID in block 602. The IMS server 102 may perform the PRID check process by receiving PRID and PUID information corresponding to the subscriber ID from the HSS 104.

It will be assumed in FIG. 6 that the IMS server 102 has checked PRIDs 1 and 3 as shown in Table 4 below. That is, the PRIDs 1 and 3 are registered in the IMS server 102 in advance as they were previously used during login.

TABLE 4

<IMS Server>
Registered PRID list for subscriber
PRID 1 : vivien__1@samsung.com
PRID 3 : vivien__3@samsung.com In response, the IMS server 102 transmits to the second MS 108 a login confirm message 604 including the authentication results, PRID information used for authentication request, and registered PRID information. The PRID information used for authentication request and the registered PRID information are included in the login confirm message 604 if the authentication for the second MS 108 is successful. The login confirm message 604 means, for example, an IMS registration confirm message.

The login confirm message 604 may be defined in an XML form in an SIP message as shown in Table 5 below, by way of example.

TABLE 5

SIP/2.0 200 OK
Contact:sip:vivien@172.16.15.24:14999;expires=3600;audio;
video="FALSE";PRID="vivien@samsung.com",
sip:vivien__1@172.16.15.25:14999;expires=3541;audio;
video="FALSE";PRID="vivien__1@samsung.com",
sip:vivien__3@172.16.15.26:14999;expires=3520;audio;
video="FALSE";PRID="vivien__3@samsung.com"
P-Associated-URI: <sip:vivien@samsung.com>,<tel:+82-10-9530-4623>

It is shown in Table 5 that login confirm message 604 includes PRID information used during authentication request and information about registered PRIDs (i.e., PRID 1 and PRID 3 in use) along with a message indicating the successful authentication. The login confirm message 604 in the form of Table 5 may be used in a similar way as login confirm message 504 of FIG. 5.

Based on the login confirm message 604, the second MS 108 may recognize that among the three PRIDs being managed by it, only a PRID 2 is available, as PRID 1 and PRID 3 are in use.

The second MS 108 transmits to the IMS server 102 a logoff request 606 for the subscriber ID used as a virtual PRID for temporary login. The logoff request 606 means, for example, an IMS de-registration request message. In block 608, the second MS 108 selects the unused PRID 2 from among the three PRIDs to use it as an actual PRID.

The second MS 108 then transmits a login request 610 to the IMS server 102 using the selected PRID 2. The login request 610 may be defined in an XML form in an SIP message as shown in Table 6 below, by way of example.

TABLE 6

REGISTER sip:samsung.com SIP/2.0
Contact:sip:vivien@172.16.15.24:14999;audio;video="FALSE";

TABLE 6-continued

PRID="vivien__2@samsung.com"
Authorization: Digest username="vivien__2@samsung.com"
P-Preferred-Identity: sip:vivien@samsung.com It is shown in Table 6 that the selected PRID 2 is used for login request 610, byway of example. The login request message 610 in the form of Table 6 may be used in a similar way as login request 510 of FIG. 5.

Upon receiving the login request 610, the IMS server 102 performs authentication on the subscriber using the selected PRID 2. If it is determined that the subscriber is an authenticated subscriber, the IMS server 102 checks the registered PRIDs corresponding to the subscriber's PUID in block 612.

Subsequently, the IMS server 102 transmits to the second MS 108 a login confirm message 614 that includes the authentication results, PRID information used during authentication request, and registered PRID information. In FIG. 6, information about PRIDs 1~3 is transmitted to the second MS 108 because all of the PRIDs 1~3 are used for login.

As the IMS server 102 confirms that the PRID 2 has been authenticated, the second MS 108 is authenticated by the IMS server 102 and finally registered in the IMS network. Accordingly, the IMS server 102 transmits or broadcasts a login status notification message 616 notifying another MS or the first MS 106 that the PRID 2 is in use together with the previously used PRIDs 1 and 3. As a result, the first MS 106 may recognize that the PRIDs 1~3 are unavailable during login because they are registered.

The second MS 108 updates a PRID list as shown in Table 7 below to notify that all of the three PRIDs managed by it may not be used as actual PRIDs for login.

TABLE 7

PRID list
    PRID 1 : vivien__1@samsung.com → Not Available (cannot
be used for logging on)
    PRID 2 : vivien__2@samsung.com → Not Available (cannot
be used for logging on)
    PRID 3 : vivien__3@samsung.com → Not Available (cannot
be used for logging on)

Meanwhile, the login status notification message 616 may be defined in an XML form in an SIP message as shown in Table 8 below, by way of example.

TABLE 8

SUBSCRIBE sip:vivien@samsung.comSIP/2.0
To: sip:vivien@samsung.com;Board=shared-01;Story=02
From: sip:vivien@samsung.com;tag=2.18.0.467339204..;MyPort=14999
Event: reg
Contact: sip:vivien@172.16.15.24:14999;audio;video="FALSE";PRID=
"vivien__1@samsung.com"
P-Preferred-Identity: sip:vivien@samsung.com
NOTIFY sip:172.16.15.24:14999 SIP/2.0
<reginfo xmlns="urn:ietf:params:xml:ns:reginfo" version="0"state="full
">
<registration aor="sip:vivien@samsung.com"id="70x8" state="active">
<uri>sip:vivien@172.16.15.24:14999</uri>
<unknown-param name="PRID">"vivien__1@samsung.com"</
unknown-param>
<uri>sip:vivien@172.16.15.25:14999</uri>
<unknown-param name="PRID">"vivien__2@samsung.com"</
unknown-param>
<uri>sip:vivien@172.16.15.26:14999</uri>
<unknown-param name="PRID">"vivien__3@samsung.com"</
unknown-param>
</reginfo>

It is shown in Table 8 that, as an example, the login status notification information includes information indicating that the PRIDs 1-3 are in a login status. The login status notification message 616 in the form of Table 8 may be used in a similar way even in step 516 of FIG. 5.

Next, the third login step by an MS according to an embodiment of the present invention will be described with reference to FIG. 7.

Figure 7:
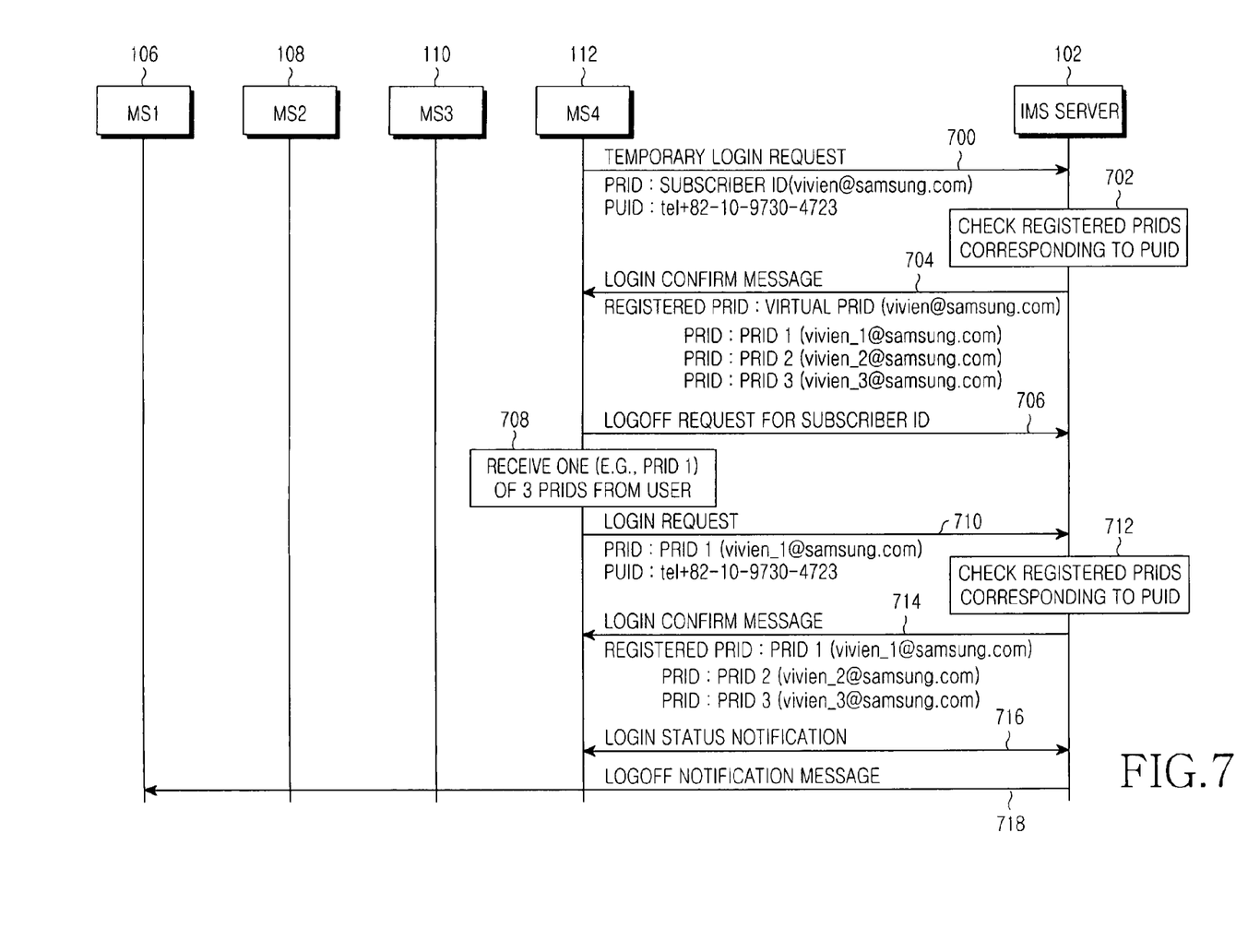
FIG. 7 is a signal flow diagram showing a third login process by an MS according to an embodiment of the present invention.

FIG. 7 illustrates a signal flow diagram of a third login process by an MS according to an embodiment of the present invention.

Referring to FIG. 7, the first to fourth MSs 106-112 represent MSs used by the same subscriber, and they all generate and manage the same PRIDs. In FIG. 7, a maximum of three PRIDs are used during login to the IMS network. The maximum number of PRIDs available in the IMS network is not limited, but subject to change.

While managing three PRIDs available for login to the IMS network 100, in order to determine an actual PRID to be used for authentication during login to the IMS network 100, the fourth MS 112 transmits a temporary login request 700 to the IMS server 102 by using a subscriber ID as a virtual PRID. The temporary login request 700 may be defined in an XML form in an SIP message as shown in above Table 2.

After performing authentication on the subscriber using the subscriber ID included in the temporary login request 700, if it is determined that the subscriber is an authenticated subscriber, the IMS server 102 checks the registered PRIDs corresponding to the subscriber's PUID in block 702. The IMS server 102 may perform the PRID check process by receiving PRID and PUID information corresponding to the subscriber ID from the HSS 104.

It will be assumed in FIG. 7 that the IMS server 102 checks PRIDs 1-3 as shown in Table 9 below. That is, the PRIDs 1-3 are registered in the IMS server 102 in advance as they were previously used during login.

TABLE 9

< IMS Server >
Registered PRID list for subscriber
PRID 1 : vivien_1@samsung.com
PRID 2 : vivien_2@samsung.com
PRID 3 : vivien_3@samsung.com In response, the IMS server 102 transmits to the fourth MS 112 a login confirm message 704 including the authentication results, PRID information used during authentication request, and registered PRID information. The PRID information used during authentication request and the registered PRID information are included in the login confirm message 704 if the authentication on the fourth MS 112 is successful. In FIG. 7, PRIDs 1-3 are included in the login confirm message 704 as registered PRIDs, by way of example.

The login confirm message 704 means, for example, an IMS registration confirm message, and may be defined in an XML form in an SIP message as shown in Table 5 above. However, in FIG. 7, vivien_1@samsung.com, vivien_2@samsung.com, and vivien_3@samsung.com are included in the login confirm message 704.

Based on the login confirm message 704, the fourth MS 112 may recognize that all of the three PRIDs being managed by it are in use.

The fourth MS 112 then transmits to the IMS server 102 a logoff request 706 for the subscriber ID used as a virtual PRID for temporary login. The logoff request 706 means, for example, an IMS de-registration request message.

After displaying on its screen the information making the user select one of the three PRIDs, the fourth MS 112 receives one of the three PRIDs from the user in block 708.

Upon receiving, for example, a PRID 1 among the three PRIDs from the user, the fourth MS 112 transmits a login request 710 to the IMS server 102 using the selected PRID 1. The login request 710 may be defined in an XML form in an SIP message according to Table 6 above. However, in FIG. 7, vivien_1@samsung.com is included in the login request.

Upon receiving the login request 710, the IMS server 102 performs authentication on the subscriber using the selected PRID 1. If it is determined that the subscriber is an authenticated subscriber, the IMS server 102 checks the registered PRIDs corresponding to the subscriber's PUID in block 712.

Subsequently, the IMS server 102 transmits to the fourth MS 112 a login confirm message 714 including the authentication results, PRID information used during authentication request, and registered PRID information. In FIG. 7, information about PRIDs 1-3 is transmitted to the fourth MS 112 because all of the PRIDs 1-3 are used for login.

As it is confirmed by the IMS server 102 that the PRID 1 has been authenticated, the fourth MS 112 is authenticated by the IMS server 102 and finally registered in the IMS network. Accordingly, The fourth MS 112 transmits or broadcasts a login status notification message 716 notifying other MSs, e.g., the first to third MSs 106-110 that the PRID 1 is in use. The login status notification message 716 may be defined in an XML form in an SIP message as shown in Table 8 below.

Because the PRIDs 1-3 were continuously unavailable even before, the IMS server 102 may omit a process of transmitting or broadcasting to the first to third MSs 106-110 the information indicating the unavailability of the PRIDs 1-3. However, the IMS server 102 may transmit to the first to third MSs 106-110 the information indicating that the PRID 1 is in use by the fourth MS 112.

The fourth MS 112 does not need to update its PRID list because it has been managing the information that all of the three PRIDs managed by the fourth MS 112 itself cannot be used as actual PRIDs for login.

After logging off the first MS 106 that has been using the PRID 1, due to the use of the RPID 1 by the fourth MS 112, the IMS server 102 transmits a logoff notification message 718 to the first MS 106.

As a result, MSs using the PRIDs 1-3 are changed from the first, second, and third MSs 106, 108, and 110 to the fourth, second and third MSs 112, 108, and 110, respectively.

As is apparent from the foregoing description, according to embodiments of the present invention, an MS may dynamically log in to an IMS network without using a separate ISIM-based authentication key in a wireless communication system. In addition, it is possible to limit the number of PRIDs corresponding to one PUID, i.e., the number of logins by one MS. If the number of MSs requesting login is greater than the maximum number of logins, the subscriber is allowed to directly select an MS(s) he or she desires to log off, making it possible to provide competitive and differentiated services to MSs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing login by a Mobile Station (MS) within an Internet Protocol Multimedia Subsystem (IMS) network in a wireless communication system, comprising:

performing temporary login to an IMS server by using a subscriber identity (ID) as a virtual Private Identity (PRID);

receiving, from the IMS server, information about at least one first PRID previously registered for the subscriber ID;

determining whether the at least one first PRID is identical to at least one second PRID managed by the MS; and if the at least one first PRID is identical to the at least one second PRID, performing logoff for the temporary login, and performing login to the IMS server using a third PRID, as one of the at least one second PRID, to log off another MS that is logged on using the third PRID.

2. The method of claim 1, wherein performing logoff for the temporary login comprises:

performing the logoff for the temporary login by transmitting a logoff request for the subscriber ID to the IMS server.

3. The method of claim 1, further comprising:

if the at least one PRID is different from the at least one second PRID, determining whether there is at least one PRID unregistered in the IMS server among the at least one second PRID; and if there is the at least one unregistered PRID, performing logoff for the temporary login, and performing login to the IMS server using a fourth PRID as one of the at least one unregistered PRID.

4. The method of claim 1, further comprising:

updating status information of the at least one second PRID as the third PRID is used for login; and transmitting the updated status information to the IMS server such that the updated status information is transmitted to other MSs that use the subscriber ID.

5. The method of claim 1, further comprising:

transmitting a logoff request for the subscriber ID to the IMS server, if there is no the at least one first PRID; and performing login to the IMS server using one of the at least one second PRIDs that are not registered in the IMS server.

6. A Mobile Station (MS) for performing login within an Internet Protocol Multimedia Subsystem (IMS) network in a wireless communication system, comprising:

a transceiver configured to communicate with an IMS server, and receive, from the IMS server, information about at least one first Private Identity (PRID) previously registered for the subscriber identity (ID);

a memory configured to store a subscriber identity (ID), the at least one first PRID and at least one second PRID being managed by the MS; and a controller configured to:

perform a temporary login to the IMS server by using the subscriber ID as a virtual PRID, determine whether the at least one first PRID is identical to at least one second PRID, and if the at least one first PRID is identical to the at least one second PRID, performing logoff for the temporary login, and perform login to the IMS server using a third PRID, as one of the at least one second PRID, to log off another MS that is logged on using the third PRID.

7. The MS of claim 6, wherein the controller performs the logoff for the temporary login by transmitting a logoff request for the subscriber ID to the IMS server through the transceiver.

8. The MS of claim 6, wherein the controller, if the at least one PRID is different from the at least one second PRID, determines whether there is at least one PRID unregistered in the IMS server among the at least one second PRID, and if there is the at least one unregistered PRID, performing logoff for the temporary login, performs login to the IMS server using a fourth PRID as one of the at least one unregistered PRID.

9. The MS of claim 6, wherein the controller updates status information of the at least one second PRID as the third PRID is used for login, and transmits the updated status information to the IMS server through the transceiver such that the updated status information is transmitted to other MSs that use the subscriber ID.

10. The MS of claim 6, wherein the controller transmits a logoff request for the subscriber ID to the IMS server if there is no the at least one first PRID, and performs login to the IMS server using one of at least one second PRIDs that are not registered in the IMS server.

\* \* \* \* \*